(12) United States Patent
Larsson

(10) Patent No.: US 6,304,757 B1
(45) Date of Patent: *Oct. 16, 2001

(54) TELECOMMUNICATIONS SYSTEM

(76) Inventor: Jarl Larsson, Källvägen 3, 184 51 Österskär (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,037
(22) PCT Filed: Nov. 20, 1996
(86) PCT No.: PCT/SE96/01513
   § 371 Date: Apr. 27, 1998
   § 102(e) Date: Apr. 27, 1998
(87) PCT Pub. No.: WO97/19570
   PCT Pub. Date: May 29, 1997

(30) Foreign Application Priority Data

Nov. 22, 1995 (SE) .................................................. 9504158

(51) Int. Cl.$^7$ ...................................................... H04Q 7/20
(52) U.S. Cl. ........................ 455/456; 455/422; 455/560
(58) Field of Search ................................. 455/414, 417, 455/403, 422, 456, 550, 556–557, 560, 435, 445

(56) References Cited

U.S. PATENT DOCUMENTS

| | | |
|---|---|---|
| 4,747,977 | 5/1988 | Balduin . |
| 5,379,451 * | 1/1995 | Nakagoshi et al. ............. 455/456 X |
| 5,402,470 * | 3/1995 | DeVaney ............................. 455/422 |
| 5,493,694 * | 2/1996 | Vlcek et al. ......................... 455/528 |
| 5,511,111 * | 4/1996 | Serbetcioglu et al. ........... 455/414 X |
| 5,546,445 * | 8/1996 | Dennison et al. ............... 455/456 X |
| 5,604,676 * | 2/1997 | Penzias ............................. 705/417 |
| 5,727,057 * | 3/1998 | Emery et al. ...................... 379/211 |
| 5,771,455 * | 6/1998 | Kennedy, III et al. ............ 455/456 |
| 5,797,091 * | 8/1998 | Clise et al. ......................... 455/404 |

FOREIGN PATENT DOCUMENTS

| | | |
|---|---|---|
| 402513 | 10/1977 | (SE) . |
| WO 92/10069 | 6/1992 | (WO) . |
| WO 94/14291 | 6/1994 | (WO) . |
| 95/30882 * | 11/1995 | (WO) . |

* cited by examiner

*Primary Examiner*—Nay Maung
(74) *Attorney, Agent, or Firm*—Burns, Doane, Swecker & Mathis, LLP

(57) ABSTRACT

The invention relates to a telecommunications system that includes a number of calling subscriber apparatus (5), a number of telephone exchange units (1) and a number of called subscriber apparatus (8). The system is adapted to enable a call incoming from a selected permanent system-associated subscriber apparatus or a mobile system-associated subscriber apparatus to be transferred to a selected permanent subscriber apparatus or a selected mobile subscriber apparatus, through the medium of a selected telephone exchange unit and its associated computer equipment. Subsequent to having received a call, the telephone exchange unit (1) and/or the computer equipment (10) establish or evaluate the geographical area and/or location of the calling subscriber apparatus. The telephone exchange unit and/or the computer equipment evaluate, establish and store the geographical areas (21*a*–21*d*) and/or locations applicable to each of a number of available subscriber apparatus. One of the available callable subscriber apparatus requested by the calling subscriber and evaluated and indicated, or selected, by the telephone exchange unit is called through the medium of a circuit belonging to the telephone exchange unit. The invention shows specifically that the available subscriber apparatus (8) informs the telephone exchange unit (1) of what area it belongs to through the activation (43) of a telephone number (45, 46) corresponding to the area (21*a*, 21*b*), connected to the telephone exchange unit (1), and is there queue-organized.

11 Claims, 2 Drawing Sheets

TELECOMMUNICATIONS SYSTEM

This application is a national stage filing under 35 U.S.C. § 371 of International Application No. PCT/SE96/01513, filed on Nov. 20, 1996, which International Application was published by the International Bureau in English on May 29, 1997.

FIELD OF INVENTION

The present invention relates to a telecommunications system and more particularly to a telecommunications system that includes a number of subscriber apparatus, a number of telephone exchange units and a number of mobile subscriber apparatus.

Thus, the invention is based on a system with which a call incoming from a chosen permanent subscriber apparatus belonging to the system or from a mobile subscriber apparatus also belonging to the system can be connected to a chosen permanent subscriber apparatus or to a mobile subscriber apparatus with the aid of a special telephone exchange unit or telephone switching unit which preferably includes associated computer equipment.

It is also required by the present invention that the telecommunications system has a so-called A-number identification means, wherein each call is accompanied with information concerning the identity of the caller, such as telephone number, therewith enabling the telephone exchange unit and/or computer equipment to evaluate the geographical area and/or position of the permanent subscriber apparatus after each received call, on the basis of this identification.

It is also required by the present invention that the telephone exchange unit and/or the computer equipment included in the telecommunications system is/are able to evaluate and has/have evaluated, established and stored the geographical areas and/or positions applicable to each of a number of available, i.e. callable, mobile subscriber apparatus.

The special telephone exchange unit shall also include a so-called call transfer function, meaning that a call which is received in a telephone exchange unit on a first input terminal and which, subsequent to evaluation, shall be connected to one of said evaluated, available mobile subscriber apparatus, shall initially be received by a telephone operator or in unattended telephone exchanges or switching centres, to be connectable to a device for connection to a speech generator that includes means for generating and presenting instructions and/or questions to the calling subscriber and, subsequent to evaluating which mobile subscriber apparatus shall be indicated or pointed out, activates means associated with said telephone exchange such as to call the indicated mobile subscriber apparatus, whereafter the telephone operator or said means is released from the connection setup through the exchange or switching centre.

There are used in the following description and claims such expressions as "permanent system-associated subscriber apparatus". This category of subscriber apparatus does not only include such subscriber apparatus that can be connected to a telephone exchange through a physical telephone line, but also includes other telephone apparatus. However, it is essential to the invention that the telephone apparatus and/or the geographical area of the person, preferably the geographical location of said person, can be established unequivocally.

Also used in the following description is the expression "mobile system-associated subscriber apparatus", by which is meant subscriber apparatus that is allocated to a mobile unit, for instance a taxi cab, express delivery vehicle, mobility service vehicles and like vehicles equipped with mobile telephone equipment, and where it is possible to establish clearly the geographical area and/or the exact location of the unit at any moment in time.

However, in this latter case, the subscriber apparatus may be a permanently connected apparatus. By a permanent subscriber apparatus is meant, in addition to the accepted meaning of the term, a mobile subscriber apparatus which has informed the exchange or switching centre that calls will be received at a particular location, the subscriber apparatus of a taxi rank or like station.

Technicians familiar with this field, however, will be aware of the types of subscriber apparatus that can be used within the two categories aforesaid.

It is also indicated in the description that the "subscriber apparatus" is active by calling and leaving messages, although it will be understood that each such activation is initiated and effected either automatically or by the person serving the subscriber apparatus concerned.

It will also be understood that the terms "telephone exchange" and "telephone exchange unit" do not refer only to a telephone exchange or a telephone station or switching centre, but also to private branch exchanges, switchboards, private manual branch exchanges and so on.

Although the present invention can be expected to obtain particular application in respect of so-called "taxi telephone exchanges", i.e. a particular telephone exchange unit that is adapted for taxi vehicles where a telephone operator is able to receive calls and provides information regarding the transportation needs of the customer, etc., and where each customer is able to call one single telephone number for a group of taxi cabs, suitably an easily memorized telephone number, it will be understood that the present invention can also be applied to other telephone exchange units and for other purposes.

DESCRIPTION OF THE BACKGROUND ART

With regard to the significant features of the present invention and other features relating thereto, it can be mentioned that there are known to the art different types of telephone exchanges which fulfil the aforesaid basic requirements regarding the function of the present invention.

The call transfer function required by the invention is known to the art and is included in many telephone exchanges, such as operator-manned subscriber exchanges. One such function is based on a facility which, during an on going call between a calling person, a first person, and a called person, a second person, such as a telephone operator, enables the second person to call a third person and transfer the call to this latter person so as to establish a call connection between the first person and the third person called by the second person without the second person being involved in a subsequent call exchange. This call transfer function is initiated by the calling person, the second person, by actuating the keypad of the telephone apparatus in a manner applicable to the telephone exchange concerned.

The second person is then released from the call connection established by the call transfer function directly between the first and the third person.

The AXE subscriber switching network retailed by Telefonaktiebolaget LM Ericsson, Stockholm, Sweden, under the designation "AXE-station" is one example of a telephone exchange that incorporates a call transfer facility.

With regard to the present state of techniques, particular reference can be made to the teachings of U.S. Pat. No. 5,432,840, in which there is described and illustrated a method and an arrangement for selective connection of a permanent subscriber apparatus to nearby mobile subscriber apparatus with the aid of exchange switching functions.

The reader is referred to this American patent publication for a more basic understanding of the present invention and related known techniques.

SUMMARY OF THE INVENTION

Technical Problems

When considering the state of the prior art as described above, it will be seen that a technical problem with telecommunications systems of the kind described in the introduction, and where the geographical locations of the mobile subscriber apparatus are structured within defined geographical areas, resides in the provision of conditions such that a mobile subscriber apparatus automatically can indicate when it leaves a delimited geographical area and enters an other limited geographical area, an adjacent geographical area.

There is also a technical problem in realizing the advantages that are obtained as the automatic indication is limited to such mobile subscriber apparatus that are stationed in cars, available for an immediate assignment.

It is also a technical problem to, with simple means and measures, be able to provide conditions such that selected delimited geographical areas are given well adapted and suitable borders, such as the borders of a selected post code division.

It also ought to be regarded as a technical problem in realizing the advantages of representing each delimited area with an area significant telephone number, given to an input connection of the used telephone exchange unit, or the like.

It is further more a technical problem in realizing the advantages that are obtained as a queue-organizer, or the like, is arranged for every such telephone number, which thereby represents a selected geographical area.

It is also a technical problem in realizing the conditions required in order to, in a mobile subscriber apparatus, be able to establish, through a navigation system, and, at a transition from one delimited geographical area to an other delimited geographical area, automatically be able to initiate a call to a telephone exchange, or the like, in order to, within it, register the identity, the queue-order and the present area of the subscriber apparatus.

Another technical problem is one of realizing the significance and the simplicity of allowing said indication from the mobile subscriber apparatus to take place over a standard telephone connection, having the form of a short call that requires no answer, and preferably while using an A-number identification, which by the call can be registered within the telephone exchange unit.

It will also be seen that a technical problem is one of realizing the significance of and the advantages that are afforded by allowing each mobile subscriber apparatus to automatically call the telephone exchange unit and thereby achieve a call setup through the telecommunications system to the telephone exchange unit, said call setup being chargeable or not chargeable to the mobile subscriber apparatus.

Solution

With the intention of solving one or more of the aforesaid technical problems, the present invention proposes a telecommunications system which includes a number of subscriber apparatus, a number of telephone exchange units, and a number of mobile subscriber apparatus, in accordance with the definition given in the introduction.

The present invention is based on the ability of said telecommunications system to provide, with the aid of a selected telephone exchange unit and associated computer equipment, a function by means of which a call incoming from a permanent system-associated subscriber apparatus or a mobile system-associated subscriber apparatus can be connected to a selected permanent subscriber apparatus or to a selected mobile subscriber apparatus, wherein one of these apparatus is operative as a calling subscriber apparatus and the other is operative as a called subscriber apparatus.

According to the invention, the telephone exchange unit and/or the computer equipment included in the system shall be adapted so as to be able to establish, after receiving a call, the geographical area and/or the location of the calling subscriber apparatus, and that the telephone exchange unit and/or the computer equipment has evaluated, established and stored at least the geographical areas and/or the locations that apply for each of a number of available, i.e. available, subscriber apparatus, wherein a call received in the telephone exchange unit on a first input connection to one of said evaluated, available subscriber apparatus can be connected to means for connection with a telephone operator, a speech generator or the like, including means for generating instructions and/or questions directed to the calling subscriber.

It is proposed that, in a telecommunications system of this kind, each mobile subscriber apparatus, belonging to the system, is provided with, or connected to, a navigation system for the establishing or evaluation of the geographical location of the subscriber apparatus, that a memory holds information regarding the geographical positions that are given to one and the same delimited geographical area, that several such areas, bordering one another, are storable within said memory, that first means are adapted to compare the momentary position of the mobile subscriber apparatus with the geographical positions stored in the memory, and that, at a comparison by the first means that gives a position within a different geographical area than a previous comparison, second means are adapted to activate third means in order to initiate and perform a call to the telephone exchange, which registers a performed area transition.

As proposed embodiments, falling within the inventive thought, it is shown that an automatic indication of a taxi cab or the like is limited to such mobile subscriber apparatus that are stationed in cars available for an immediate assignment.

It is further shown that selected delimited geographical areas are to be well adapted and suitable, and adapted to an expected application, regarding their borders, such as the borders of different post code areas.

It is further shown that each delimited area is to be represented by an area significant telephone number, given to a selected input connection of the used telephone exchange unit.

The possibilities to arrange a queue-organizer, or the like, within the telephone exchange unit for every area significant telephone number, and thereby selected geographical area, are shown.

As proposed embodiments, falling within the inventive thought, it is further shown that said call through said third means can takes place over a communications path that is separate from a standard telephone connection.

It is also proposed that at least some of the available subscriber apparatus are coordinated in a telephone exchange memory with respect to category.

It is also proposed that a calling mobile subscriber apparatus shall be adapted to deliver a code significant to its geographical area or location.

It is also proposed that each of the available mobile subscriber apparatus is adapted to insert into the computer equipment an idle mark or available mark and a code representative of the geographical area or location of said subscriber apparatus at each particular time through the medium of a call setup to the telephone exchange unit.

It is also proposed that each mobile subscriber apparatus is allocated a category and a queue order or line order after having established a connection to the telephone exchange unit.

Advantages

The primary advantages that are afforded in a telecommunications system in accordance with the present invention reside in the provision of conditions for an automatic indication of the momentary geographical locations or areas of available mobile subscriber apparatus and for respective available mobile subscriber apparatus to self automatically make an entry of its position and present area, through the activation of a call to an area significant telephone number, or the like, belonging to the telephone exchange unit, and separated from a group number belonging to the telephone exchange unit.

The primary characteristic features of an inventive telecommunications system are set forth in the characterizing clause of the following claim 1.

BRIEF DESCRIPTION OF THE DRAWINGS

An embodiment of a telecommunications system at present preferred and having features significant to the present invention will now be described with reference to the accompanying drawings, in which.

DETAILED DESCRIPTION OF PROPOSED EMBODIMENTS

Figure 1:
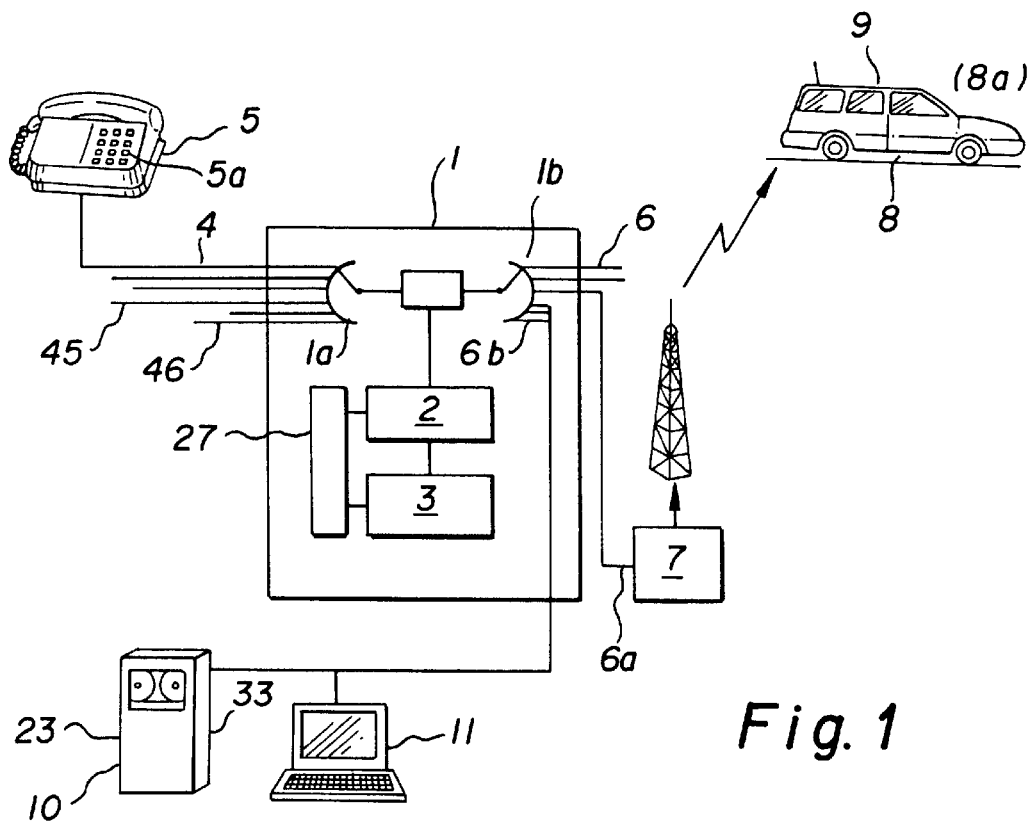
FIG. 1 is a schematic overview of an inventive arrangement which, for the sake of clarity, is shown to include only one permanent subscriber apparatus and only one mobile subscriber apparatus.

FIG. 1 illustrates a telecommunications system which is constructed in accordance with the principles of the invention and which includes a telephone exchange unit in the form of a telephone station 1 provided with the necessary selector devices 1a, 1b for connecting each incoming call to a subscriber, directly or indirectly, chosen by the calling subscriber.

The illustrated embodiment includes the particular case in which each call to a chosen "group number" shall be handled by a special computer apparatus without the aid of a telephone operator.

The telephone exchange 1 includes control equipment 2 and computer equipment and/or system 3 connected to the control equipment by conductors, wherein the control equipment 2 and the computer system 3 coact mutually to activate and execute a chosen through-connection function. This through-connection function is designated "transfer" and is known as an integrated function in telephone stations and telephone exchanges, switching centres, and consequently it is unnecessary to describe this activation and implementation of the transfer function in detail in this document. The invention is based on such activation taking place through the medium of the computer equipment 3.

It suffices to establish in this regard that a call incoming from a person having a permanent subscriber apparatus 5 via a group number and through the medium of coaction with equipment in the telephone exchange is, inter alia, able to influence the transfer function, is connected directly to a mobile subscriber apparatus 8, being a part of a taxi cab 9 or the like, selected by the computer equipment through the medium of special criteria.

The telephone exchange 1 can be connected to a number of permanent system-associated subscriber apparatus with the aid of a number of physical lines 4 belonging to group numbers, of which apparatus only one is shown in FIG. 1 and referenced by numeral 5.

Extending from the telephone exchange 1 is a number of outgoing lines 6, of which a number, 6a, are connected to equipment 7 with whose aid a speech connection can be established with a mobile system-associated subscriber apparatus chosen from among several available apparatus, wherein only one such apparatus is shown. This apparatus is referenced 8 in the drawing.

When the subscriber apparatus 5 has activated a "group number", the call will be through-connected to a chosen outgoing line 6b to which computer equipment 10 is connected.

It is assumed that the mobile system-associated subscriber apparatus 8 is mounted in a taxi cab 9, and that the apparatus 8 is manned by a cab driver.

The transfer of a telephone call from the unit 7 to the subscriber apparatus 8 can be effected in a known manner, for instance with the aid of the mobile telephone system NMT900/450 that has been in use in Sweden for many years. The telephone exchange may include equipment, such as said computer equipment 10, or may be connected to external equipment, such as computer equipment through the medium of one or more conductors 6b as illustrated in FIG. 1.

The arrangement illustrated in FIG. 1 also includes a queue-organizer 11 that functions to place in a queuing order calls incoming from a number of permanent, simultaneously calling subscriber apparatus 5.

The following description is based on the occurrence of only one call, and consequently the function of the queue-organizer 11 need not be described in detail.

A stationary subscriber apparatus 5 can be connected selectively to a nearby subscriber apparatus 8 chosen by the computer equipment with the aid of said telephone exchange unit and computer equipment 10 coacting therewith, even when the permanent subscriber apparatus activates a call to a given group number.

In order for this to be possible, it is necessary for a telephone exchange 1 to connect all incoming calls directed to said given group number to the computer equipment 10 which includes devices and means which, subsequent to establishing a call connection between the permanent subscriber apparatus 5 and the computer equipment 10, function to generate artificial speech and compile questions and, in accordance with the answers given, establish the geographical area and/or the place in which the permanent subscriber apparatus 5 is located.

This can be achieved by requesting the permanent subscriber apparatus 5 to key-in the first two digits of its own telephone number, for instance through the medium of its keypad 5a, said code being able to establish the geographical area in which the subscriber apparatus is located through the medium of means (not shown) connected to a device (not shown).

Alternatively, the permanent subscriber apparatus 5 may be requested to key-in the post code or zip code of the geographical area concerned, through his keypad 5a.

According to one variant, which is most preferred, the telephone exchange 1 is able to evaluate the number (A-number identification) of the calling subscriber apparatus 5 in coaction with the computer equipment 10, and to establish the location and also the address of the subscriber apparatus through the medium of said computer equipment.

The present invention is thus based on the ability to evaluate the location and the address of the subscriber apparatus, and also on the ability of establishing the locations and possible addresses of every available subscriber apparatus and storing this information in the telephone exchange unit, and on the ability of the telephone exchange unit to transfer the call of a calling subscriber apparatus 5 to a selected nearby available called subscriber apparatus 8.

Reference is made to the aforementioned American patent application for a clearer understanding of suitable switching arrangements in this respect, and then particularly to the embodiment described with reference to and illustrated in FIG. 3.

Figure 2:
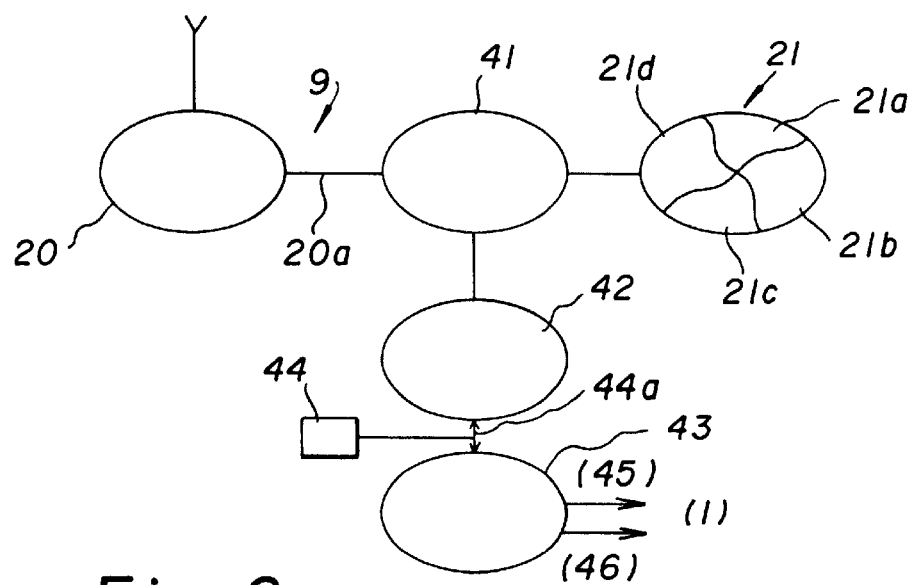
FIG. 2 is a simplified block schematic of a proposed equipment within a mobile subscriber apparatus.

With reference to FIG. 2, there is shown in a simplified manner a block schematic of the equipment required in the mobile unit 9 or subscriber apparatus 8.

The mobile unit 9 comprises a navigation system 20 of a previously known kind, and the momentary position in a coordinate system of the geographical location of the mobile subscriber apparatus is evaluated or established through this system 20. The coordinates of the position can be regarded as appearing on line 20a.

A memory 21 holds the information of the geographical positions or coordinates that are given to one and the same area. The geographical positions of several delimited areas are stored in this memory.

A delimited areas ought to be given suitable geographical borders. One such suitable border can be the one that coincide with the borders of a post code area.

The memory 21 can preferably include very narrow delimited areas for the centre areas of a town, narrow delimited areas for the suburban areas of a town, and large delimited areas for the more out of town areas.

The embodiment is limited to schematically presenting certain areas 21a, 21b, 21c and 21d, supposedly bordering one another.

First means 41 are adapted to be able to compare the momentary position (appearing on line 20a) of the mobile subscriber apparatus 9 with the geographical positions already stored in the memory 21.

Said first means 41 can also comprise a memory where a previous position of the unit 9 is stored or where a code belonging to an area is stored.

The unit 9 is supposedly within the area 21a.

At a comparison by the first means 41 that gives a position within a different geographical area, for instance 21b, than that of an immediately previous comparison (21a), second means 42 are adapted to activate third means 43 in order to initiate and perform a call to the telephone exchange 1, which register and stores a performed area transition.

It should be noted that said third means 43 can only be activated when the unit 9 is available for an assignment.

Available or idle marks are generated in fourth means 44, that can be connected to a fare meter, or the like.

FIG. 2 show a contact, labelled 44a, which is put into a closed state at an available mark and an open state at an idle mark.

The third means 43 also comprises a memory, wherein a number of telephone numbers are stored, one for each area 21a, 21b, 21c and 21d.

The telephone number that corresponds to the present area is firstly evaluated, Thereafter a connection is made to the telephone exchange unit 1, as the third means 43 receives signals to initiate a call to the telephone exchange unit.

The selected telephone number directs the connection through the communications network to an input connection 45 of the telephone exchange unit 1, which input connection has been given a number.

Figure 3:
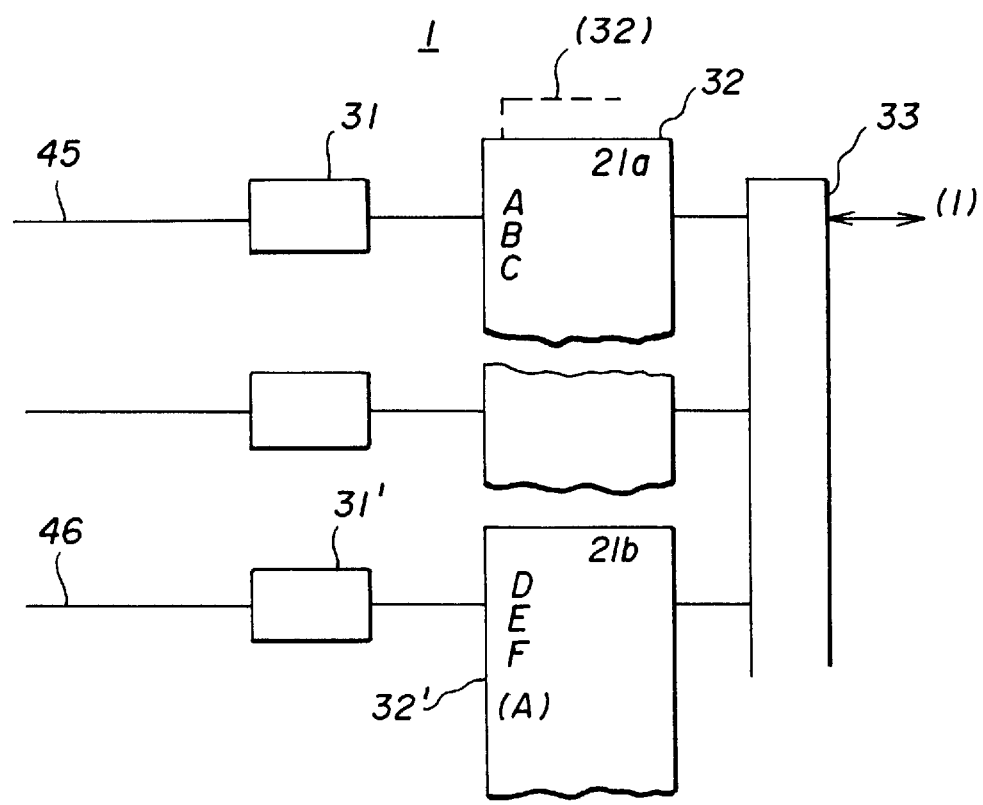
FIG. 3 is a simplified block schematic of a proposed equipment within an equipment belonging to a telephone exchange unit.

The telephone exchange unit 1 receives the call in a circuit 31, according to FIG. 3, and the received A-number identification is stored within a position A in a memory 32, but the exchange unit leaves no answer indication.

The memory 32 can be regarded as representing every available taxi cab within the area 21a, in queue-order and with the A-number identifications A, B and C.

An other area 21b has its own telephone number, directed to an other connection 46, which in a similar manner is stored within a memory 32' and where available taxi cabs within the area 21b are represented in queue-order D, E, F, and so on.

A circuit 33, connected to the memories 32, 32', is adapted to control the content of the memories 32, 32', and the circuit 33 is adapted to remove an available taxi cab (A) incoming to the area 21b from an other area (21a) as soon as the registration (A) has been performed within the own area (21b).

It is also fundamental to the invention that this call shall only need to load the telephone exchange unit 1 with low costs or with no cost at all, since the costs involved through the telephone exchange must all be distributed equally between the system subscribers. This would seem to be the only practical possibility, irrespective of whether an individual subscriber utilizes the system or not.

In this regard, it is proposed in accordance with the invention that although the subscriber apparatus 8 makes a call to the telephone exchange, the third means 43 (FIG. 2) will be adapted so that when the connection is established and the A-number identification has been sent to the memory 32, 32' of the telephone exchange, this will represent an "indication" of that subscriber 8 has now transferred to an other area.

So that this "indication" can be made without cost to the telephone exchange unit, it is proposed that a call established over the available telephone system shall only be noted by the telephone exchange and without this answering or needing to answer the call.

This can be done by letting the subscriber apparatus 8, through the circuit 43, terminate the connection before the telephone exchange unit 1 has answered the call, or by adapting the circuits in the telephone exchange unit to not answer calls.

Alternatively, the call can be made over a communications path separate from the telephone connection and having the form of a data connection, or the like.

According to the present invention, at least some of the available subscriber apparatus 8 are coordinated with respect to category a category (or group) in a memory of the telephone exchange unit. This is shown in FIG. 3 with a memory (32) in dotted lines.

Each of the available mobile subscriber apparatus is adapted to insert into the computer equipment an available mark and a code that reveals its immediate geographical area or geographical location, through its own connection with the telephone exchange unit.

Subsequent to establishing a connection, each mobile subscriber apparatus will be allocated a category (or group) and a queue order in the memory 32 (32), 32' within the telephone exchange unit. The category can be evaluated from the A-number identification.

The telephone exchange unit and/or the computer equipment may conveniently utilize means for, inter alia, generating artificial speech which presents certain instructions and questions to the calling subscriber and stores his/her messages and answers.

The separate communications channel may be a data link, such as a short message service, SMS, or a person-paging system that includes written messages, or alternative the mobile GSM system.

It will be understood that the invention is not restricted to the aforedescribed and illustrated exemplifying embodiment thereof and that modifications can be made within the scope of the inventive concept as defined in the following claims.

What is claimed is:

1. A telecommunications system comprising:
   a number of subscriber apparatus,
   a number of telephone exchange units, and
   a number of mobile subscriber apparatus,
   wherein the system is adapted to provide, with the aid of a selected telephone exchange unit and associated computer equipment, a function by means of which a call incoming from a system-associated subscriber apparatus or a mobile system-associated subscriber apparatus can be connected to a selected subscriber apparatus or to a selected mobile subscriber apparatus,
   wherein one of these apparatus is operative as a calling subscriber apparatus and the other is operative as a called subscriber apparatus,
   wherein the telephone exchange unit and/or the computer equipment has evaluated, established and stored at least the geographical areas and/or the locations that apply for each of a number of subscriber apparatus and mobile subscriber apparatus,
   wherein after receiving a call said telephone exchange unit and/or the computer equipment included in the system establishes or evaluates the geographical area and/or the location of the calling subscriber apparatus,
   wherein each of the available mobile subscriber apparatus is adapted to enter, in the computer equipment, an available or idle mark and a code that discloses the immediate geographical area or location of said mobile subscriber apparatus, through the medium of a connection with the telephone exchange unit,
   wherein within the telephone exchange unit, possibilities are provided to arrange a queue-organizer, for every area significant telephone number, and thereby selected geographical area,
   wherein a mobile subscriber apparatus, belonging to the system, is provided with, or connected to,
   a) a navigation system for the establishing or evaluation of the geographical location of the mobile subscriber apparatus,
   b) a memory related to the mobile subscriber apparatus which holds information regarding the geographical positions that are given to one and the same delimited geographical area, that several such areas, bordering one another, are storable within said memory, wherein selected delimited geographical areas are given well adapted and suitable borders, including borders of different post code areas and/or wherein each delimited area is represented by an area significant telephone number given to a selected input connection of the used telephone exchange unit,
   c) first means are adapted to compare momentary position of the mobile subscriber apparatus with the geographical positions stored in the memory,
   d) second means, which at a comparison by the first means that gives a position within a different geographical area than a previous comparison, being adapted to output an activation signal, and
   e) third means which is activated by the activation signal of the second means in order to initiate to the telephone exchange unit, a performed area transition, wherein said call through said third means takes place over a telephone connection but is adapted so that the called subscriber does not answer.

2. A system according to claim 1, wherein an automatic indication of a taxi cab is limited to such mobile subscriber apparatus that are stationed in cars, available for an immediate assignment.

3. A system according to claim 2, wherein selected delimited geographical areas are given well adapted and suitable borders, including the borders of different post code areas.

4. A system according to claim 3, wherein each delimited area is represented by an area significant telephone number, given to a selected input connection of the used telephone exchange unit.

5. A system according to claim 2, wherein each delimited area is represented by an area significant telephone number, given to a selected input connection of the used telephone exchange unit.

6. A system according to claim 1, wherein said call through said third means takes place over a communications path that is separate from a standard telephone connection.

7. A system according to claim 6, wherein subsequent to establishing said connection, each mobile subscriber apparatus is allocated to a group and a queue order.

8. A system according to claim 1, wherein at least some of the available subscriber apparatus are associated with respect to a group within a telephone exchange memory.

9. A system according to claim 1, wherein a calling mobile subscriber apparatus is adapted to present a code significant to its area or location.

10. A system according to claim 1, wherein each delimited area is represented by an area significant telephone number, given to a selected input connection of the used telephone exchange unit.

11. A method for communication for a telecommunications system; including a number of subscriber apparatus, a number of telephone exchange units, and a number of mobile subscriber apparatus having access to a navigation system, wherein one of these apparatus is operative as a calling subscriber apparatus and another is operative as a called subscriber apparatus, comprising the steps of:
   evaluating, establishing and storing by the telephone exchange unit and/or the computer equipment at least the geographical areas and/or the locations that apply for each of a number of subscriber apparatus and mobile subscriber apparatus:

after receiving a call, the telephone exchange unit and/or the computer equipment included in the system, establishing or evaluating the geographical area and/or the location of the calling subscriber apparatus;

entering in the computer equipment by each of the available mobile subscriber apparatus an available or idle mark and a code that discloses the immediate geographical area or location of said mobile subscriber apparatus, through the medium of a connection with the telephone exchange unit;

providing possibilities within the telephone exchange unit to arrange a queue-organizer, for every area significant telephone number and thereby selected geographical area;

said mobile subscriber apparatus, belonging to the system, being provided with or connecting to said navigation system which establishes or evaluates its geographical location;

holding information, regarding each geographical position that is given to one and the same delimited geographical area, in a memory related to the mobile subscriber apparatus;

storing several such areas, bordering one another, within said memory;

assigning well adapted and suitable borders to selected delimited geographical areas including borders of different post code areas and/or representing each delimited area by an area significant telephone number, given to a selected input connection of the used telephone number, and thereby selected geographical area;

comparing the momentary position of the mobile subscriber apparatus with the geographical positions stored in the memory by a first means;

at a comparison by the first means that gives a position within a different geographical area than a previous comparison, a second means activating a third means in order to initiate to the telephone exchange unit a performed area transition, wherein said call through the third means takes place over a telephone connection but is adapted so that the called subscriber does not answer.

* * * * *